ARNOLD B. STEINER
W. H. McNEELY
INVENTORS

Patented Jan. 17, 1950

2,494,912

UNITED STATES PATENT OFFICE 2,494,912

HIGHER ALKYLENE GLYCOL ESTERS OF ALGINIC ACID

Arnold B. Steiner, La Jolla, and William H. McNeely, San Diego, Calif., assignors to Kelco Company, San Diego, Calif., a corporation of Delaware Application January 20, 1947, Serial No. 723,116

10 Claims. (Cl. 260—209.6)

1

This invention relates to reactions between alginic acid and certain of the epoxyparaffins or alkylene oxides by which the properties of the acid are changed in a manner which imparts a new utility to the product.

This invention relates also to the products of the above recited reactions, these products having the desirable properties of the water-soluble salts and lower esters of alginic acid, together with certain other useful properties which these compounds do not possess.

In a copending application filed April 3, 1944 by Arnold B. Steiner under Serial No. 529,423, now Patent 2,426,125, it is disclosed that alginic acid may be reacted directly with alkylene oxides containing not more than five carbon atoms to form a theretofore unknown series of addition compounds which have been termed "glycol alginates." These compounds differ from alginic acid and from the water-soluble alkali metal alginates in the following respects.

Alginic acid is substantially insoluble in water; its salts with the alkali metals, magnesium, ammonium and many organic bases are freely water-soluble, yielding colloidal solutions of high viscosity. The glycol alginates likewise are freely water-soluble and form viscous and colloidal solutions.

The soluble salts of alginic acid above described form gels or gelatinous precipitates with the water-soluble salts of the alkaline-earth metals (except magnesium), of aluminum and of the heavy metals, and with all but the weakest of the acids. By contrast, the glycol alginates show much less reactivity with the salts and the acids which gelatinize or precipitate the soluble alginic salts.

The soluble alginic acid salts are generally prepared to give a pH value above 5.0 whereas the glycol alginates may be produced with pH values up to 6.5 but ordinarily are below pH 5.0. Thus the ranges are upward from pH 5 with the alginic salts and downward from pH 5 in the case of the esters.

The reaction between alginic acid and the lower epoxyparaffins (five carbon atoms or less) takes place with considerable readiness. As disclosed in the above copending application, a moist alginic acid in fibrous or other subdivided form is treated with the alkylene oxide in a closed vessel, the reaction usually coming to completion in from one to three hours. The product retains the fibrous form (unless a large excess of water be present) and appears in the original degree of comminution. No further preparation is required other than to evaporate or extract any excess oxide which it may contain and to bring the water content to a standard.

2

More difficulty was found in reacting alginic acid with the higher oxides (six to eighteen carbon), the difficulty increasing as the molecular weight of the oxide increases. The reaction becomes slower, esterification is less complete, the yield is smaller and the essential property of water solubility is not fully developed when methods previously described are used.

We have now discovered that these difficulties may be avoided and a satisfactory yield of products of high emulsifying value obtained by certain modifications of the original process, to wit:

(a) By the partial neutralization of the alginic acid prior to esterification, as disclosed in the copending application of Arnold B. Steiner and William H. McNeely, filed December 22, 1945 under Serial No. 636,938;

(b) By reacting the alginic acid with the higher oxide in the presence of a water-miscible solvent such as acetone, glycerol or one of the lower aliphatic alcohols; or (c) By reacting the alginic acid with a higher oxide and again reacting the primary product with one of the lower oxides; or (d) By reacting the alginic acid with a higher oxide, preferably in the presence of a solvent, freeing the reaction product from the glycol formed as by-product, and repeating the treatment with the higher oxide, this alternative being most efficacious in the use of oxides from C6 to C8.

These various steps and the products resulting therefrom are described with reference to the structural diagrams of the attached drawings, in which Fig. 1 illustrates the known structure of alginic acid;

Figure 4:
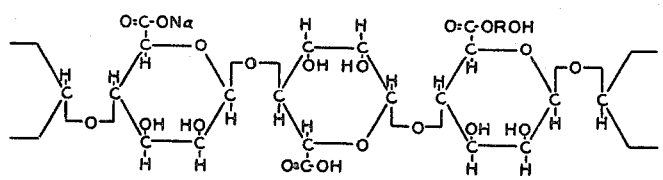
Figure 5:
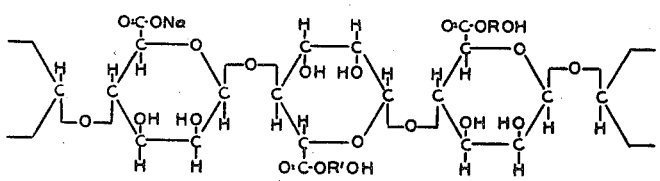

Fig. 4 represents the probable structure of the product resulting from the partial neutralization of the acid followed by incomplete esterification of the remaining carboxyl groups, and Fig. 5 shows the probable structure of a product in which the carboxyl of one unit of the alginic acid has been satisfied with sodium, another with a higher alkylene oxide R'O, and a third with a lower alkylene oxide RO.

It will be understood that all of these diagrams have been simplified by omitting any duplication of identical unit structures or linkages, alginic acid being a straight chain polymer which is often of extreme length.

Figure 1:
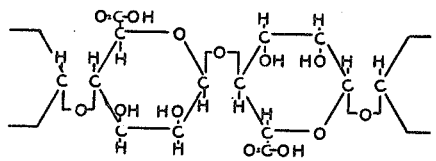

Alginic acid is known to consist essentially of anhydro-D-mannuronic acid residues linked glycosidically in accordance with the formula of Fig. 1. In this structure the mannuronic units are linked in such manner that the carboxyl groups are free to react while the aldehyde groups are shielded by linkages. This diagram represents only two links in a polymeric chain which may contain from one hundred to several hundred units.

Figure 2:
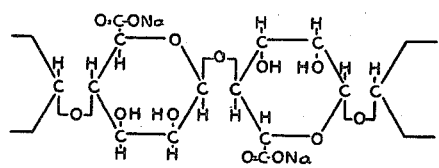
Fig. 2 shows the known result of complete neutralization of the carboxyl groups of alginic acid with sodium.

The theoretical combining weight of alginic acid is the weight of one anhydro-D-mannuronic unit or 176. The actual combining weight of the commercial acid is nearer 215, indicating the presence of unknown, nontitratable substances. When alginic acid is combined with sodium in the proportion (about) 215:23 the product is a neutral salt, the structure being as in Fig. 2 which shows the carboxyl groups of the two (illustrative) mannuronic units satisfied by the base.

Figure 3:
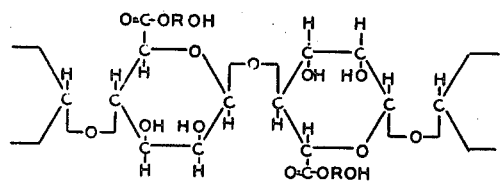
Fig. 3 shows the probable structure of a product resulting from the complete esterification of alginic acid with an alkylene oxide RO, where R represents any $C_nH_{2n}$ alkylene group.

If it were possible to esterify alginic acid completely, the structure of the product would be as illustrated in Fig. 3, in which the replaceable hydrogen of each carboxyl has attached to the oxygen of the oxide and through it to one of the carbons while the other carbons link with the terminal oxygen of the carboxyl. The validity of this structure is supported by the observation that alkalis decompose the ester, forming the salt of Fig. 2.

The alginic acid used as raw material may be produced by any of the methods known in the prior art, preferably by a method such as that of the Thornley and Walsh Patent 1,814,981 which yields the free acid in fibrous form. The acid need be only in a state of commercial purity and preferably contains a small proportion of calcium.

The free acid is first brought to the physical condition in which it is most amenable to reaction with the alkylene oxide. This involves reduction of the original water content, which is of the order of 80%, to approximately 50% by weight. A desirable way of producing this reduction is by repeated passage of the acid through a hammer mill supplied with a current of warm, dry air but any method of drying by gentle heating, evacuation or extraction with water-miscible solvents may be used.

A water content of from 45% to 55%, while not critical, has been found to give the best reaction rate during esterification with the least hydrolysis of the alkylene oxide. The reduced water content also strongly facilitates subdivision, the product of the above combined drying and shedding step being a fluffy mass of fine, thread-like fibres which expose a very large surface area per unit of mass.

The step of partial neutralization described in copending application Serial No. 638,938 is not essential to esterification with the higher oxides, but it is highly desirable. The use of this step renders it possible to stabilize the product by raising its pH value above the critical level of stability, reducing the number of free carboxyl groups in the final product. It also facilitates the production of a fully soluble glycol alginate, reduces the extent to which both the alginic acid and the alkylene oxide are hydrolized during the esterifying reaction, and materially accelerates the reaction between the oxide and the acid.

It is believed that when a quantity of a base insufficient for complete neutralization is added to the acid, it does not completely neutralize a portion of the acid molecules, leaving the remaining molecules uncombined but, rather, that it distributes itself in such manner as to satisfy a portion only of the carboxyl groups of each molecule. For the same reason it appears probable that the remaining carboxyl groups of each molecule may be completely or partially blocked by esterification. The structure of the resultant product is believed to be as generally indicated in Fig. 4.

In this figure the carboxyl of the first unit in the fragmental chain has been satisfied with sodium, the second carboxyl remains unreacted while the third is esterified with an alkylene oxide. In a chain having a great number of units, each having one carboxyl group, both neutralization and esterification may proceed by very small increments and the resultant product may have any percentage proportion of its carboxyl groups combined with the base, or with the oxide, or free, according to the extent to which each reaction is carried.

Partial neutralization may be produced before, during or after the completion of the drying step. In general the method used is to react the acid with any base producing a water-soluble salt of the acid, as for example ammonia, the lower amines or any of the basic compounds of the alkali metals or magnesium. The preferred base, which may be used in the form of the hydroxide, carbonate or phosphate, may conveniently be reacted with the acid by mixing the acid with an alcoholic solution or slurry of the base. In reactions involving the lower oxides a relatively small portion of the carboxyl groups are thus satisfied but for the higher oxide reactions we prefer to neutralize from 25% to 50% of the carboxyl groups, thus hastening the esterification and improving the solubility of the final product.

Alkylene oxides containing from six to eighteen carbon atoms may be prepared by any of the methods described in the literature. In the instant experiments the method reported by Findley et al. in The Journal of the American Chemical Society, 67, page 412 (1945) was followed. This method employs peracetic acid to epoxidize the corresponding olefin to the 1,2-epoxyalkane. Thus, 1,2-epoxyhexane was prepared by reacting hexene-1 with peracetic acid.

Regardless of the method of preparation, the higher oxides are sparingly soluble in water, the solubility decreasing as the number of carbon atoms in the oxide chain increases. This in turn affects the reactivity of the oxide with alginic acid, the reactions being carried out essentially in an aqueous medium. For example, when using finely divided and partially neutralized alginic acid containing about 50% water, 1,2-epoxypropane esterified approximately 70% of the carboxyl groups of the acid, 1,2-epoxyhexane esterified only about 41% of the carboxyls, 1,2-epoxyheptane about 25% and 1,2-epoxyoctane about 10% under the same conditions. Increasing the excess of oxide in the reaction mixture does not noticeably improve the extent of esterification and it appears that the relative water solubility of the oxide is the limiting factor.

This difficulty was overcome and the percentage esterification increased by the addition to the reaction mass of a water-miscible solvent for the oxide, as for example acetone or glycerol. When acetone was added to the reaction mixture in an amount equal to that of water present, the per cent esterification increased from 10% to 24% in the case of 1,2-epoxyoctane, while the substitution of glycerol in the same proportion raised the esterification percentage to 28%.

The increased esterification due to the addition of the mutual solvent is of major importance, in increasing the water-solubility of the product. The 10% esterified product of 1,2-epoxyoctane, for example, is insoluble in water while the 24% and 28% products are readily soluble, yielding viscous colloidal solutions.

For the reaction of alginic acid with the higher oxides the contacting vessel should be in the nature of an autoclave, closed to prevent loss of vapor, and should be provided with efficient stirring apparatus to insure complete contact between solid and liquid. Means to control the temperature, such as a jacket arranged for both heating and cooling, should be provided. The feasible temperature limits for esterification appear to be about 35° and 70° C. while the indications are that the optimum temperature lies within the range 45° to 60° C., varying somewhat with other conditions.

The examples below indicate practical ways of effecting the reaction and describe the products obtained.

EXAMPLE 1

*Preparation of hexylene glycol alginate*

Moist, commercial alginic acid was prepared for neutralization by suspending 1660 parts of the acid (300 parts dry weight) in 1100 parts isopropyl alcohol with five minutes' stirring. A slurry of 31 parts trisodium phosphate in 600 parts alcohol was then added, this quantity being sufficient to neutralize about 25% of the carboxyl groups of the acid. After thirty minutes' stirring the reaction product was drained, squeezed as dry as possible, shredded by passing it through a hammer mill and dried for five minutes at 130° F. The partially neutralized acid had 84% solids, which is higher than is usually considered desirable. The yield in this reaction is quantitative.

The 25% neutralized acid was brought back to 50% water content by adding 83 parts water to 157 parts of the above product containing 120 parts solids. A small quantity of a wetting agent (in this instance, 2 parts "Aerosol OT" (dioctyl ester of sodium sulfosuccinic acid, 10% aqueous solution)) facilitates the absorption of water. The remoistened acid was then mixed in an autoclave with 113 parts 1,2-epoxyhexane, equal to two equivalents taking the combining weight of commercial acid at 215. The mixture was maintained at an internal temperature of 40° C. for three hours and allowed to cool. Another equivalent (57 parts) of the oxide was then added and the reaction completed in three hours at an internal temperature of 50° C. The reaction product, after cooling, was extracted with acetone to recover any excess oxide and any glycols which had formed and was dried for thirty minutes at 130° F.

The yield of hexylene glycol alginate was 142 parts, dry weight, or 118% on the original anhydrous acid. The ester readily dissolved in water to give a 1¼% solution of pH 3.4 and viscosity of 100 centipoises. Neutralization and saponification showed that 34% of the carboxyl groups in the product were free, 41% were esterified and 25% were neutralized with sodium.

EXAMPLE 2

*Preparation of heptylene glycol alginate*

Following the procedure above described, alginic acid (300 parts dry weight) was 35% neutralized with trisodium phosphate (42 parts) and dried to 55% solids.

To 150 parts dry weight of this partially neutralized acid was added 238 parts (3 equivalents) of 1,2-epoxyheptane. The mixture was stirred for seven hours at an internal temperature of 50° C. The reaction product was freed from excess oxide and from glycols by extraction with acetone and was dried for one hour at 130° F.

The yield of the ester was 182 parts or 121% on the original acid. Neutralization and saponification indicated that 40% of the carboxyl groups of the product were free, 25% were esterified and 35% were combined with sodium. The product dissolved in water to give a 1¼% solution of pH 3.3 and a viscosity of 4600 centipoises.

EXAMPLE 3

*Preparation of octylene glycol alginate*

The following mixture was reacted in an autoclave for eight hours at 50° C. and the reaction product extracted with isopropyl alcohol and dried for forty-five minutes at 130° F.

|  | Parts |
|---|---|
| Alginic acid, 25% neutralized, dry weight | 150 |
| Water carried by acid | 163 |
| Water added as such | 87 |
|  | 250 |
| Acetone | 250 |
| 1,2-epoxyoctane (3 equivalents) | 270 |

The net yield of the ester was 152 parts or 101% on the original alginic acid. The carboxy groups in the product were 51% free, 24% esterified and 25% neutralized. A 1¼% solution of the product was hazy but no insoluble specks or particles were observed. The pH of the solution was 3.4 and the viscosity 100 centipoises.

Under the same conditions but with glycerol substituted for the acetone the esterification of the carboxyl groups was 28% and the solution of the product had a pH of 3.5.

Omitting both the acetone and the glycerol and using water as the sole vehicle, the degree of esterification was only 10% and the reaction product was insoluble in water.

EXAMPLE 4

*Preparation of decylene glycol alginate*

The following mixture was reacted in an autoclave, first for four hours at 50° C., then for four hours at 60° C. The reaction product was extracted with isopropyl alcohol and dried for one hour at 130° F.

|  | Parts |
|---|---|
| Alginic acid, 25% neutralized, dry weight | 150 |
| Water | 190 |
| 1,2-epoxydecane (3 equivalents) | 329 |

The saponification test indicated that 56.5% of the carboxyl groups were free, 18.5% esterified and 25% neutralized. The yield was 180 parts or 120% on the alginic acid. A 1¼% solution of the product was slightly hazy and had a pH value of 3.4 and a viscosity of 110 centipoises. The higher temperature during the second four hours increased the degree of esterification but effected some degradation of the algin.

EXAMPLE 5

*Preparation of dodecylene glycol alginate*

The following mixture was reacted in an autoclave for eleven hours at 50° C. and the reaction product extracted and dried for one hour at 130° F.

| | Parts |
|---|---|
| Alginic acid, 40% neutralized, dry weight | 173 |
| Water | 150 |
| Glycerol | 150 |
| 1,2-epoxydodecane (3 equivalents) | 388 |

The yield of the ester, dry basis, was 216 parts or 125% on the original alginic acid. Saponification showed that 39% of the carboxyl groups of the product were free, 21% were esterified and 40% were combined with sodium. A 1¼% aqueous solution of the product had a viscosity of 180 centipoises and 3.2 pH.

EXAMPLE 6

*Preparation of octadecylene glycol alginate*

The following mixture was reacted in an autoclave for four hours at 50° C. and for eight additional hours at 55° C. The reaction product was extracted and dried for one hour at 130° C.

| | Parts |
|---|---|
| Alginic acid, 50% neutralized | 179 |
| Water | 153 |
| Glycerol | 150 |
| 1,2-epoxyoctadecane (2¼ equivalents) | 613 |

The yield of the ester, dry basis, was 283 parts or 158% of the original acid. The product had 33% of its carboxyl groups free, 17% esterified and 50% neutralized. A 1¼% solution had a viscosity of 110 centipoises and a pH value of 3.4.

EXAMPLE 7

*Preparation of mixed glycol alginates*

Reaction products approaching complete esterification and having highly desirable properties may be prepared by the method illustrated in this example, the product of reaction with one of the higher oxides being again acted on by an oxide of considerably lower molecular weight.

A portion of the octylene glycol alginate product obtained in Example 3 (by reaction in the presence of acetone) was given three washes with a cold, 50–50 water-alcohol mixture previously brought to pH 1.8 with hydrochloric acid. This treatment removes the sodium with which part of the carboxyls of the original product had been combined, rendering them again available for esterification. This was followed by two washes with alcohol, and air drying.

The air dried product (75 parts dry weight) was placed in an autoclave together with water sufficient to bring the water content to 50%. Ammonia in gaseous form was then introduced until 5% of the acidity had been neutralized. Four equivalents of propylene oxide were then added, the autoclave closed and the temperature maintained at 50° C. for seven hours with agitation. After removing the excess oxide with an organic solvent the product was dried at 130° F. The yield was 105 parts, or 140% on the octylene glycol alginate used as starting material.

This mixed ester dissolved in water to give a hazy solution of pH 3.3. On saponification and calculation, 13% of the carboxyl groups were shown to be free, 24% were esterified with the octylene derivative and 58% with the propylene derivative, and 5% were combined with ammonia.

A large number of mixed esters may be formed in this general manner, by subjecting the product of a first reaction with one of the higher oxides to a second reaction with one of the lower. Ordinarily, ethylene or propylene oxide will be used for the second reaction, by reason of the availability and low cost of these agents.

*Reactions of products with heavy metal salts and with acids*

The water-soluble alginic salts (e. g., sodium and ammonium alginate) are extremely reactive with salts of the heavy metals and the alkaline-earth metals, giving gels or precipitates. The glycol alginates of the higher oxides are less reactive than the salts, while the glycol alginates with the lower oxides are still less reactive.

For example, a sodium alginate solution gives a fibrous precipitate on the addition of calcium chloride solution; the higher glycol alginates yield hard gels, while the lower glycol alginates yield soft gels under the same conditions.

Again, a solution of a propylene glycol alginate 70% esterified will not gel on the addition of a strong acid, while a solution of octylene or decylene glycol alginate 20% esterified will gel with a strong acid but not with a weak acid such as acetic.

These differences in reactivity, however, are due to the lower degree of esterification producible with the higher oxides rather than to the lengthening of the hydrocarbon chain, and the reactivity falls off rapidly as percentage esterification increases. While a 70% esterified propylene glycol alginate is still somewhat reactive the mixed propylene octylene glycol alginate at only a slightly higher esterification percentage is completely nonreactive with alkaline-earths at pH 3.3 and is subject only to a slight thickening when mixed with calcium chloride solution at pH 4.2.

In all cases the compatibility of the product with acids and with alkaline-earth metal salts improves as the degree of esterification is increased, and for this reason the use of the water-miscible solvent described in Examples 3 and 5 is often highly advantageous.

*Selection and proportioning of solvent*

The presence of water is essential to the reaction, which takes place between the solid acid and the aqueous solution of the alkylene oxide. At and above six carbon atoms in the molecule the oxide becomes very sparingly water-soluble and reaction is correspondingly slow. Raising the temperature of reaction increases its velocity but tends to degrade the acid (by depolymerization) while increasing the water content of the reaction mixture tends (as does elevation of temperature) to increase the extent to which hydrolysis of the oxide to the corresponding glycol occurs.

The use of a mutual solvent accelerates the desired reaction between oxide and acid by increasing the concentration of oxide in the solution, and at the same time tends materially to restrain the undesired hydrolysis of the oxide. For this purpose any organic liquid which is inert to alginic acid and to the oxide, which is a solvent for the oxide and which is soluble in water may be used. A wide variety of solvents are available for this purpose and a selection may be made from the group including the lower ketones and the lower monohydric and polyhydric alcohols.

The 50–50 ratio of solvent to water used in these experiments is not critical though it is generally satisfactory. The effect of the solvent in promoting reaction appears to increase as the proportion increases, up to the point at which the hydrophilic solvent begins to shrink and harden the acid fibre by withdrawing water from it. With different organic solvents the optimum water:solvent ratio may vary considerably, but the step is at least moderately effective within the limits 80 water:20 solvent to 30 water:70 solvent.

*Evaluation of emulsifying power of the product*

The major utility of the esters herein described is as emulsifying agents or, perhaps more accurately, as emulsion stabilizers. For this purpose the higher glycol alginates show to material advantage as compared with the lower, and to very great advantage as compared with the water-soluble alginic salts such as sodium alginate.

The following quick-breaking test was devised for evaluating the emulsion stabilizing value of the product and is conducted as follows. A 50% emulsion of a light mineral oil was made by adding the oil to a water solution of the ester while stirring at 800 R. P. M. The concentration of the glycol alginate in each case was 0.6% of the weight of the completed emulsion. In order to eliminate variations in the viscosities of different esters, enough sodium alginate was added to each solution to bring the viscosity to about 100 centipoises. This addition varied from 0.02% to 0.40% of the emulsion weight. To control the effect of pH the solution was titrated with sodium hydroxide solution to bring the pH within the range 5 to 6. Sodium benzoate, 0.2%, was added as a preservative.

After stirring the mixtures of oil and solution until thoroughly blended the emulsions were twice homogenized, using the same apparatus, speed and feed rate in each case. The homogenized emulsions were placed in 70 x 25 mm. vials and stored at a constant temperature of 50° C., the separation of oil from the bottom of the vial being noted at intervals and recorded in millimeters. These results yielded curves from which the time required to produce a 3 mm. break could be read with considerable accuracy. The results thus obtained are tabulated below.

*Emulsion stability test*

| Ester Used | mm. break after storing for— | | | | | Days for 3 mm. break |
|---|---|---|---|---|---|---|
| | 15 min. | 1 day | 2 days | 6 days | 20 days | |
| Propylene | | .0 | 1.5 | 10.5 | 26.0 | 3 |
| Hexylene | | 1.0 | 1.5 | 3.5 | 15.0 | 5 |
| Heptylene | | .0 | 0.2 | 2.0 | 7.0 | 7 |
| Octylene | | .0 | .0 | 1.0 | 4.0 | 12 |
| Decylene | | .0 | .0 | 1.0 | 11.0 | 10 |
| Octylene-Propylene | | .0 | .0 | 0.8 | 3.5 | 17 |
| Sodium Alginate | 2.0 | Complete | | | | ½ hour |

It will be evident from these results that the esters above six carbon atoms in the alkylene chain, ranging from 41% to 18% esterification, are materially more effective than the propylene ester at about 70% esterification. The emulsifying value of sodium alginate in this quick-breaking emulsion is negligible.

We claim as our invention:

1. The method of modifying alginic acid to render it water-soluble which comprises: treating said acid with a 1,2 alkylene oxide containing not less than six nor more than eighteen carbon atoms, in the presence of water and of a mutual solvent for water and for said oxide.

2. The method of modifying alginic acid to render it water-soluble which comprises: treating said acid in the presence of water and of a mutual solvent for water and for the alkylene oxide with a 1,2 alkylene oxide containing not less than six nor more than eighteen carbon atoms, and further treating the product of said treatment with a 1,2 alkylene oxide containing not more than five carbon atoms.

3. The product of reaction between alginic acid and a 1,2 alkylene oxide containing not less than six nor more than eighteen carbon atoms: a solid, alkylene glycol alginate characterized by substantially complete solubility in water to form substantially clear, viscous, colloidal solutions.

4. The product of reaction between alginic acid and a 1,2 alkylene oxide containing not less than six nor more than eighteen carbon atoms: a solid, alkylene glycol alginate characterized by substantially complete solubility in acidulated water to form substantially clear, viscous, colloidal solutions.

5. A solid, substantially completely water-soluble modification product of alginic acid in which a part of the carbonxyl groups of said acid are esterified with a 1,2 alkylene oxide containing not less than six nor more than eighteen carbon atoms, and a part of said carboxyl groups are esterified with a 1,2 alkylene oxide containing not more than five carbon atoms, said product characterized by forming clear, viscous, colloidal, aqueous solutions.

6. The method of modifying alginic acid to render it water soluble which comprises: reacting said acid in the presence of water and of a mutual solvent for water and the alkylene oxide with a 1,2 alkylene oxide containing not less than six nor more than eighteen carbon atoms; freeing the reaction product from glycol formed as a byproduct of said reaction, and reacting the glycol-free product, in the presence of water and said solvent, with a 1,2 alkylene oxide containing not less than six nor more than eighteen carbon atoms.

7. The process of claim 1 wherein glycerol is the solvent.

8. The process of claim 1 wherein acetone is the solvent.

9. A substantially completely water-soluble long chain partial ester of alginic acid in which part not to exceed about 41% of the carboxyl groups are esterified with a 1,2 alkylene oxide of 6 to 18 carbon atoms, said partial ester being further characterized by yielding clear, viscous colloidal solutions in water.

10. A substantially completely water-soluble long chain partial ester of alginic acid in which about 17 to about 41% of the carboxyl groups are esterified with a 1,2 alkylene oxide of 6 to 18 carbon atoms, about 25 to about 50% of the carboxyl groups are reacted with a base, the remainder of said carboxyl groups being unreacted, said partial ester being further characterized by yielding clear, viscous colloidal solutions in water.

ARNOLD B. STEINER.
WILLIAM H. McNEELY.

REFERENCES CITED

The following references are of record in the file of this patent:

UNITED STATES PATENTS

| Number | Name | Date |
|---|---|---|
| 2,426,125 | Steiner | Aug. 19, 1947 |

OTHER REFERENCES

Malvezin, Chem. Zentr., 1944, vol. I., pages 757–758.